(12) United States Patent
Chen et al.

(10) Patent No.: US 11,674,049 B2
(45) Date of Patent: Jun. 13, 2023

(54) CONDUCTIVE STRUCTURE HAVING SELF-ASSEMBLED PROTECTIVE LAYER AND SELF-ASSEMBLED COATING COMPOSITION

(71) Applicant: TPK Universal Solutions Limited, Wanchai (HK)

(72) Inventors: Lung-Pin Chen, Chiayi (TW); Yi-Lung Yang, Taoyuan (TW); Chun-Hung Chu, Hsinchu (TW)

(73) Assignee: TPK Universal Solutions Limited, Wanchai (HK)

( * ) Notice: Subject to any disclaimer, the term of this patent is extended or adjusted under 35 U.S.C. 154(b) by 99 days.

(21) Appl. No.: 16/890,089

(22) Filed: Jun. 2, 2020

(65) Prior Publication Data

US 2021/0147706 A1    May 20, 2021

(30) Foreign Application Priority Data

Nov. 14, 2019 (CN) .......................... 201911114973.7

(51) Int. Cl.
| | | |
|---|---|---|
| *C09D 133/12* | (2006.01) | |
| *H01B 5/14* | (2006.01) | |
| *B32B 3/10* | (2006.01) | |
| *B32B 15/09* | (2006.01) | |
| *C08K 5/18* | (2006.01) | |

(52) U.S. Cl.
CPC .............. *C09D 133/12* (2013.01); *B32B 3/10* (2013.01); *B32B 15/09* (2013.01); *H01B 5/14* (2013.01); *B32B 2255/26* (2013.01); *B32B 2307/202* (2013.01); *B32B 2307/412* (2013.01); *C08K 5/18* (2013.01)

(58) Field of Classification Search
CPC ..................................................... B32B 15/02
See application file for complete search history.

(56) References Cited

U.S. PATENT DOCUMENTS

2008/0283799 A1* 11/2008 Alden ..................... C30B 29/60
                                                              252/500

FOREIGN PATENT DOCUMENTS

| CN | 102803405 A | 11/2012 |
|---|---|---|
| CN | 102874813 A | 1/2013 |
| CN | 105684098 A | 6/2016 |
| CN | 106567041 A | 4/2017 |
| CN | 107683533 A | 2/2018 |
| CN | 211906990 U | 11/2020 |
| JP | 2013510792 A | 3/2013 |
| JP | 2016535453 A | 11/2016 |

(Continued)

*Primary Examiner* — Ian A Rummel
(74) *Attorney, Agent, or Firm* — Cooper Legal Group, LLC

(57) ABSTRACT

A conductive structure having a self-assembled protective layer and a self-assembled coating composition are provided. The self-assembled coating composition includes a resin, a solvent, and a self-assembled additive. The self-assembled additive includes alkylamine, fluoroalkylamine, fluoroaniline, or a derivative thereof. The self-assembled additive has a concentration in a range of from about 0.01 mg/L to about 100 mg/L in the self-assembled coating composition. The conductive structure includes a substrate, a conductive layer, and the self-assembled protective layer. The conductive layer is disposed over the substrate. The self-assembled protective layer covers the conductive layer and has a resin, a solvent, and the above-mentioned self-assembled additive.

10 Claims, 4 Drawing Sheets

(56) References Cited

FOREIGN PATENT DOCUMENTS

| | | | |
|---|---|---|---|
| TW | 200837403 | A | 9/2008 |
| TW | 201307062 | A | 2/2013 |
| TW | 201730239 | A | 9/2017 |
| TW | 201833257 | A | 9/2018 |
| TW | M602718 | U | 10/2020 |

* cited by examiner

CONDUCTIVE STRUCTURE HAVING SELF-ASSEMBLED PROTECTIVE LAYER AND SELF-ASSEMBLED COATING COMPOSITION

CROSS-REFERENCE TO RELATED APPLICATION

This application claims priority to China Application Serial Number 201911114973.7, filed Nov. 14, 2019, which is herein incorporated by reference.

BACKGROUND

Field of Disclosure

The present disclosure relates to a self-assembled coating composition and a conductive structure.

Description of Related Art

In electronic devices, a protective layer is usually provided on a conductive layer to prevent the conductive layer (e.g., metal, metal alloy, or metal oxide) from being corroded. For example, a surface of copper can be covered with a resin material layer to isolate the copper from a corrosive medium in the environment, thereby achieving the effect of anti-corrosion. However, even if the resin material protective layer is provided on the conductive layer, the metal in the conductive layer is still at risk of being corroded.

SUMMARY

According to some embodiments of the present disclosure, a conductive structure having a self-assembled protective layer is provided, which includes a substrate, a conductive layer, and the self-assembled protective layer. The conductive layer is disposed over the substrate. The self-assembled protective layer covers the conductive layer, in which the self-assembled protective layer includes alkylamine, fluoroalkylamine, fluoroaniline, or a derivative thereof.

According to some embodiments of the present disclosure, the conductive layer includes a conductive microwire, a conductive nanowire, a conductive particle, or a conductive cluster.

According to some embodiments of the present disclosure, the conductive layer is a sheet-like layer or a mesh-like layer.

According to some embodiments of the present disclosure, the conductive layer is a transparent conductive layer and includes a transparent matrix layer and a plurality of silver nanowires embedded in the transparent matrix layer.

According to some embodiments of the present disclosure, the self-assembled protective layer includes from 75 wt % to 95 wt % of a resin and from 0.1 wt % to 10 wt % of a self-assembled additive.

According to some embodiments of the present disclosure, the resin includes polyacrylate, epoxy, Novolac, polyurethane, polyimide, polyether, polyester, polyvinyl butyral or a combination thereof.

According to some embodiments of the present disclosure, the self-assembled protective layer has a thickness in a range of from about 10 nm to about 0.5 cm.

According to some embodiments of the present disclosure, a self-assembled coating composition is provided, which includes a resin, a solvent, and a self-assembled additive. The self-assembled additive includes alkylamine, fluoroalkylamine, fluoroaniline, or a derivative thereof, and the self-assembled additive has a concentration in a range of from about 0.01 mg/L to 100 mg/L in the self-assembled coating composition.

According to some embodiments of the present disclosure, the resin includes polyacrylate, epoxy, Novolac, polyurethane, polyimide, polyether, polyester, polyvinyl butyral or a combination thereof.

According to some embodiments of the present disclosure, the solvent includes water, ethanol, isopropanol, acetone, tetrahydrofuran, N-methylpyrrolidone, dimethylformamide, dimethyl sulfoxide, propylene glycol methyl ether acetate, propylene glycol monomethyl ether, ethyl acetate or a combination thereof.

According to some embodiments of the present disclosure, the self-assembled additive includes alkylamine, fluoroalkylamine, fluoroaniline, or a derivative thereof.

BRIEF DESCRIPTION OF THE DRAWINGS

Various aspects of the present disclosure will be fully understood from the following detailed description when reading the accompanying drawings. It is worth noting that various features are not drawn to scale in accordance with standard practice in the industry. In fact, dimensions of the various features may be arbitrarily increased or decreased for clarity of discussion.

DETAILED DESCRIPTION

Figure 1A:
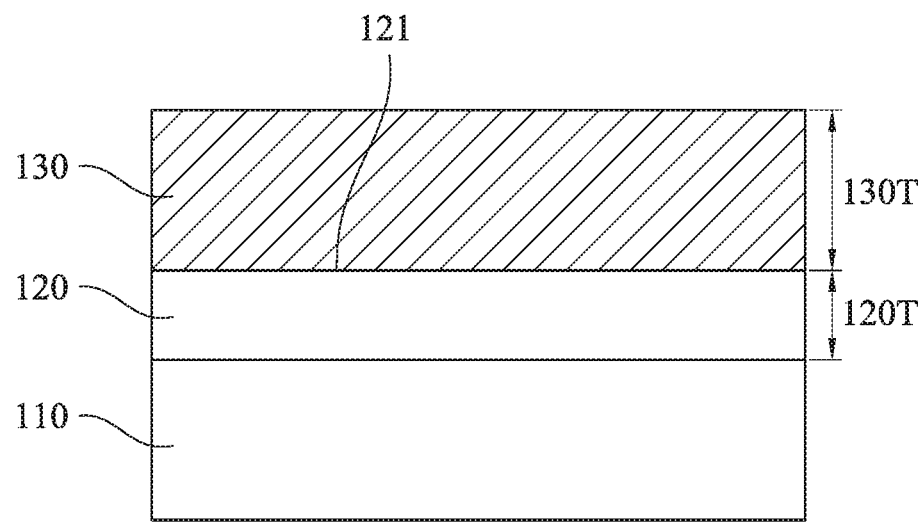
FIG. 1A is a cross-sectional view of a conductive structure according to some embodiments of the present disclosure.

The drawings disclose a plurality of embodiments of the present disclosure below. For the sake of clarity, many practical details will be explained in the following description. However, it should be understood that these practical details are not intended to limit the present disclosure. That is, in some embodiments of the present disclosure, these practical details are not necessary. For clarity, the size or thickness of the components may be exaggerated and not shown in the original dimensions. Moreover, for the sake of simplicity of the drawings, some conventional structures and elements will be illustrated in a simplified schematic manner in the drawings.

In the description, spatially relative terms, such as "beneath," "below," "over," "on," and the like, may be used herein for ease of description to describe one element or feature's relationship to another element(s) or feature(s) as shown in the figures. The true meaning of the spatially relative terms includes other orientations. For example, when the figure is rotated by 180 degrees, the relationship between one component and another component may change from "beneath" or "below," to "over" or "on." In addition, the spatially relative descriptions used herein should be interpreted the same.

One aspect of the present disclosure provides a self-assembled coating composition, which includes a resin, a solvent, and a self-assembled additive. Details of each component of the self-assembled coating composition are detailed below.

In some embodiments, the resin is an ultraviolet (UV) curable resin or a heat curable resin. In some embodiments, the resin includes polyacrylate, epoxy, Novolac, polyurethane (PU), polyimide (PI), polyether, polyester, polyvinyl butyral (PVB), or a combination thereof. In some embodiments, the resin may be an optically transparent resin.

In some embodiments, the solvent includes water, ethanol, isopropanol (IPA), acetone, tetrahydrofuran (THF), aprotic solvents (e.g., N-methylpyrrolidone (NMP), dimethyl formamide (DMF), or dimethyl sulfoxide (DMSO), etc.), propylene glycol methyl ether acetate (PGMEA), propylene glycol monomethyl ether (PGME), ethyl acetate (EAC), or a combination thereof.

In some embodiments, the self-assembled additive includes alkylamine, fluoroalkylamine, fluoroaniline, or a derivative thereof.

The self-assembled additive has a concentration in a range of from about 0.01 mg/L to about 100 mg/L in the self-assembled coating composition, for example, being about 0.02, 0.05, 0.1, 0.2, 0.5, 0.7, 1, 5, 10, 20, 30, 40, 50, 60, 70, 80, 90, 95, or 99 mg/L. The self-assembled coating composition of the present disclosure has fluidity and can be coated onto a surface of a conductive material (e.g., a metal nanowire) to suppress corrosion of the conductive material. In the self-assembled coating composition, if the concentration of the self-assembled additive is less than the above-mentioned concentration range, a sufficient effect of inhibiting corrosion cannot be achieved. If the concentration of the self-assembled additive is greater than the above-mentioned concentration range, the self-assembled additive having hydrophobic properties will be detrimental to a subsequent coating process.

Figure 1B:
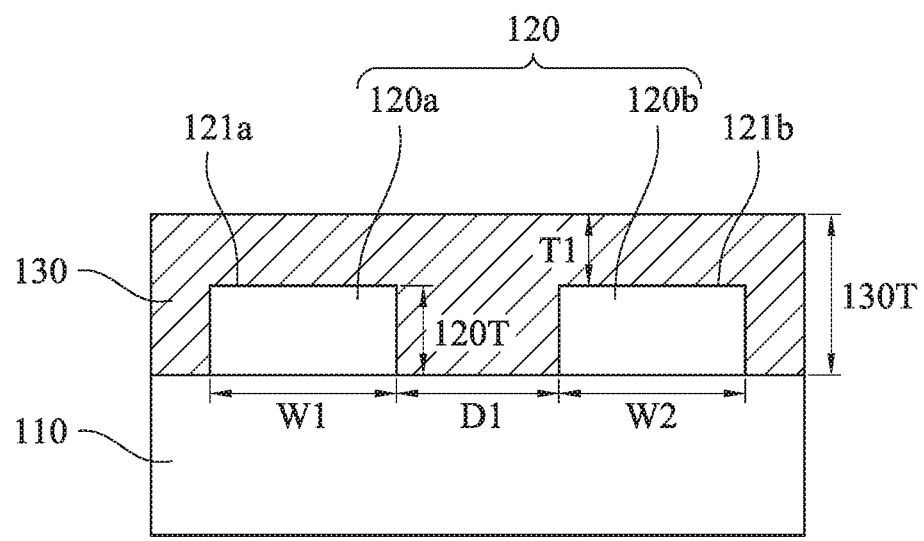
FIG. 1B is a cross-sectional view of a conductive structure according to some embodiments of the present disclosure.

Another aspect of the present disclosure also provides a conductive structure. FIGS. 1A and 1B are cross-sectional views of conductive structures 100 and 200 according to some embodiments of the present disclosure, respectively. Please refer to FIGS. 1A-1B simultaneously. The conductive structure 100 includes a substrate 110, a conductive layer 120, and a self-assembled protective layer 130.

The substrate 110 may be a flexible substrate or a rigid substrate. The flexible substrate includes polyethylene terephthalate (PET), cycloolefin polymer (COP), cyclic olefin copolymer (COC), polycarbonate (PC), poly(methyl methacrylate) (PMMA), polyimide (PI), polyethylene naphthalate (PEN), polyvinylidene difluoride (PVDF) or polydimethylsiloxane (PDMS), but is not limited thereto. The rigid substrate includes glass, wafer, quartz, silicon carbide (SiC) or ceramic, but is not limited thereto.

The conductive layer 120 is disposed over the substrate 110. In some embodiments, the conductive layer 120 includes a conductive material, such as a metal, a metal alloy, or a metal oxide. In some embodiments, the conductive layer 120 may be aluminum, palladium, gold, silver, nickel, copper, tin, iron, or an alloy thereof, such as brass. In some embodiments, the conductive layer 120 may include a conductive microwire, a conductive nanowire, a conductive particle, or a conductive cluster. As used herein, a microwire refers to a structure having an aspect ratio (length:diameter) of at least 10 and a diameter of at least 1 micron and less than 1000 microns, a nanowire refers to a structure having an aspect ratio of at least 10 and a diameter of at least 1 nanometer and less than 1000 nanometers, a conductive particle refers to a structure having an aspect ratio of less than 10 and a diameter of less than 1000 microns, and a conductive cluster refers to a group of conductive elements (particles, wires, etc.) integrally connected and having a total width of less than 1000 microns and a total length of less than 1000 microns. In some embodiments, the conductive layer 120 may be a sheet-like layer, in which a conductive material forms a substantially continuous, interrupted layer. In some embodiments, the conductive layer 120 may be a mesh-like layer, in which a conductive material includes a plurality of threads or wires are interwoven and a plurality of open spaces are defined between the plurality of threads or wires. In some embodiments, the conductive layer 120 may be a bulk material, which is formed by gathering or stacking many single atomic planes of at least one material or granular mixtures of at least one material. In some embodiments, the conductive layer 120 is a transparent conductive layer, which includes a transparent matrix layer and a plurality of silver nanowires embedded in the transparent matrix layer. In some embodiments, the conductive layer 120 may be a single-layered or multi-layered stack structure. In some embodiments, the conductive layer 120 has a thickness 120T in a range of from about 10 nm to about 5 μm, preferably in a range of from about 20 nm to about 1 μm, and more preferably in a range of from about 50 nm to about 200 nm, for example, being 55, 60, 70, 100, 120, 150, 180, or 195 nm.

Taking a silver nanowire conductive layer 120 as an example, silver nanowires can be overlapped with each other to form a silver nanowire conductive network. A suitable aspect ratio (length:diameter) of the nanowire is, for example, in a range of from 10 to 100,000. When conductive nanowires with a high aspect ratio are used, the conductive network can be realized using a lower density of nanowires, so that the conductive network is substantially transparent in a visible light range of from about 440 nm to about 700 nm. It should be noted that after nanonization of the metal, such as silver, is performed, a surface area ratio of the metal per unit area will be greatly increased; that is, a high proportion of atoms are located on a surface of the material, making the material exhibit high chemical activity. In addition, at such a small size, atoms or surrounding electrons will exhibit quantum effect, so their characteristics may be different from those of a macroscopic-sized material. Compared with a large-sized metal material (i.e., a macroscopic-sized metal material), it is more difficult to suppress corrosion of a microscopic-sized metal, such as the silver nanowires. However, the self-assembled coating composition of the present disclosure can provide sufficient protection for both macroscopic-sized and microscopic-sized metal conductive layers.

In some embodiments, the conductive layer 120 may be a patterned conductive layer, as shown in FIG. 1B. Please refer to FIG. 1B. The conductive structure 200 includes conductive layers 120a and 120b. In some embodiments, a distance D1 between the conductive layers 120a, 120b is in a range of from about 5 μm to about 500 μm, for example, being about 6, 10, 15, 30, 50, 70, 100, 200, 250, 300, 400, 450, 480, or 490 μm. In some embodiments, the conductive layers 120a, 120b respectively have a width W1 and a width W2 in a range of from about 5 μm to about 1,000 μm, for example, being about 6, 10, 50, 100, 200, 500, 700, 900, 950, or 990 μm.

Please continue to refer to FIGS. 1A and 1B. The self-assembled protective layer 130 covers the conductive layer 120 and includes from 75 wt % to 95 wt % of a resin and from 0.1 wt % to 10 wt % of a self-assembled additive. For example, the self-assembled protective layer 130 may include 76, 80, 85, 90, 92, or 94 wt % of the resin. For example, the self-assembled protective layer 130 may include 0.2, 1.5, 1, 2, 5, 7, or 9 wt % of the self-assembled additive. In some embodiments, the resin includes polyacrylate, epoxy, Novolac, polyurethane (PU), polyimide (PI), polyether, polyester, polyvinyl butyral (PVB), or a combination thereof. In some embodiments, the self-assembled additive includes an alkylthiol, fluoroalkylthiol, fluorothiophenol, or a derivative thereof. In some embodiments, the self-assembled protective layer 130 is optically transparent.

In some embodiments, the self-assembled protective layer 130 may be formed from the self-assembled coating composition described above. Specifically, the self-assembled coating composition may be coated on the conductive layer 120 by any suitable method, and processes such as curing and drying are performed to form the self-assembled protective layer 130 on the surface of the conductive layer 120. In some embodiments, the self-assembled coating composition may be directly coated on the surface of the conductive material, and an etching process is then performed to form the patterned conductive layer 120 and the patterned self-assembled protective layer 130. That is, the self-assembled protective layer 130 is formed only on the upper surface 121 of the conductive layer 120, as shown in FIG. 1A. In other embodiments, the patterned conductive layers 120a and 120b may be formed by using an etching process, and the self-assembled coating composition is then coated on the conductive layers 120a and 120b, as shown in FIG. 1B.

In some embodiments, the self-assembled protective layer 130 has a thickness 130T in a range of from about 10 nm to about 0.5 cm. Specifically, the surface of the conductive layer 120 is covered with at least the self-assembled protective layer 130 with a thickness of about 10 nm. As shown in FIG. 1B, the self-assembled protective layer 130 on the upper surfaces 121a and 121b of the conductive layers 120a and 120b has a thickness T1 of at least 10 nm. The self-assembled protective layer 130 can provide a strong anti-corrosion barrier and strengthen the corrosion resistance of metal, thereby protecting the conductive layer 120 and effectively suppressing metal corrosion.

The present disclosure will be described in more detail with reference to experimental examples, but the present disclosure is not limited to the following experimental examples.

EXPERIMENTAL EXAMPLE 1

Figure 2:
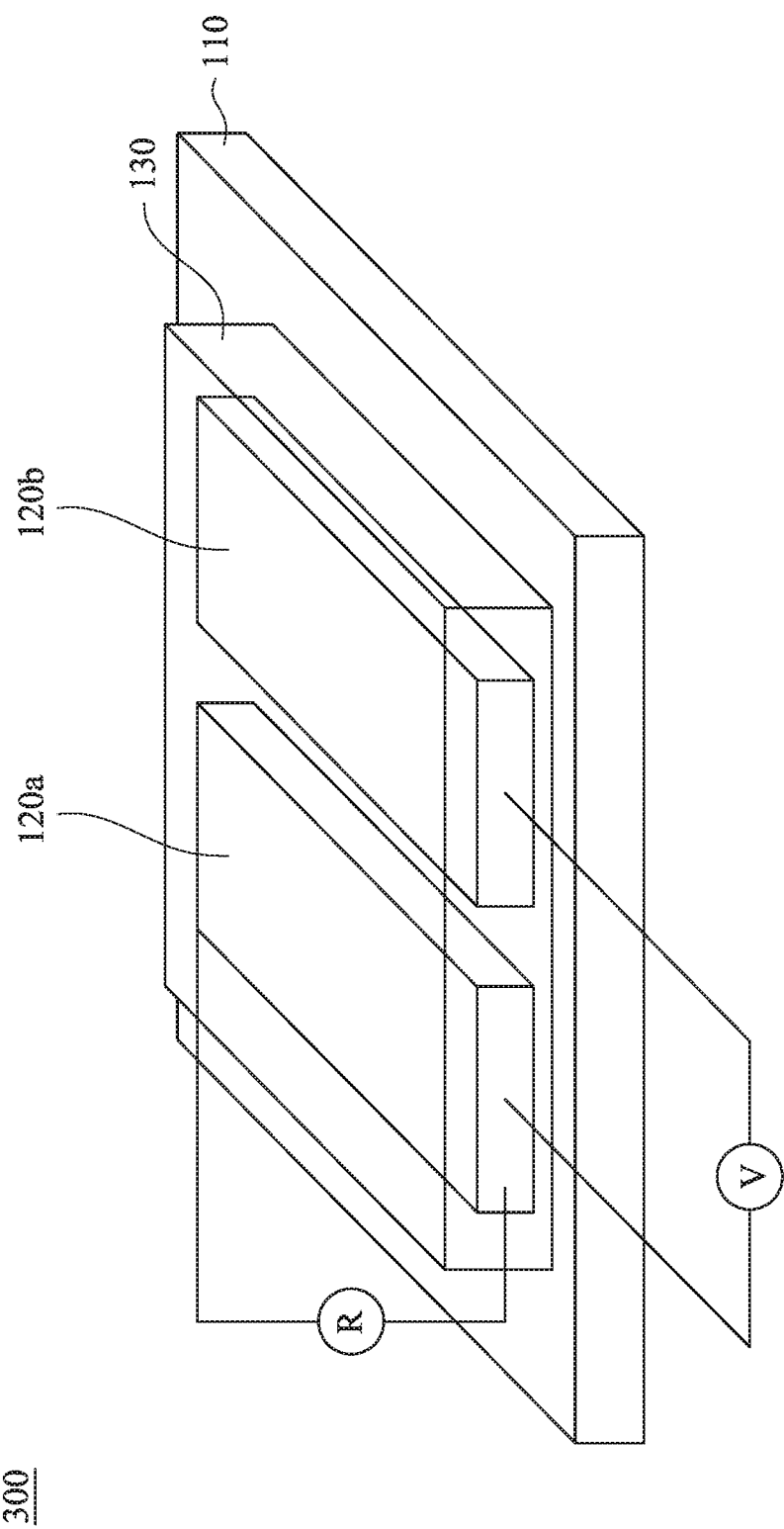
FIG. 2 is a schematic diagram of an environmental test of a conductive structure according to some embodiments of the present disclosure.

Please refer to FIG. 2. The conductive structure 300 included a substrate 110, conductive layers 120a, 120b, and a self-assembled protective layer 130. The substrate 110 was a polyethylene terephthalate (PET) substrate and had a thickness of 50 μm. The conductive layers 120a and 120b were silver nanowire conductive layers, and each of them had a thickness of about 30 nm and a width of about 200 μm. A distance between the conductive layers 120a and 120b was about 30 μm. The conductive layers 120a and 120b had a sheet resistance of 70Ω/□. The self-assembled protective layer 130 included 98 wt % of poly(methyl methacrylate) (acrylic resin) and 2 wt % of 2,3,4,5,6-pentafluoroaniline. The thickness of the self-assembled protective layer 130 was about 40 nm. That is, the self-assembled protective layer 130 had a thickness of about 10 nm on the upper surfaces of the conductive layers 120a and 120b.

COMPARATIVE EXAMPLE 1

The conductive structure of Comparative Example 1 differs from that of Experimental Example 1 in that the conductive layer of Comparative Example 1 had only the poly(methyl methacrylate) as the protective layer thereon, and the protective layer did not contain any self-assembled additive.

Figure 3:
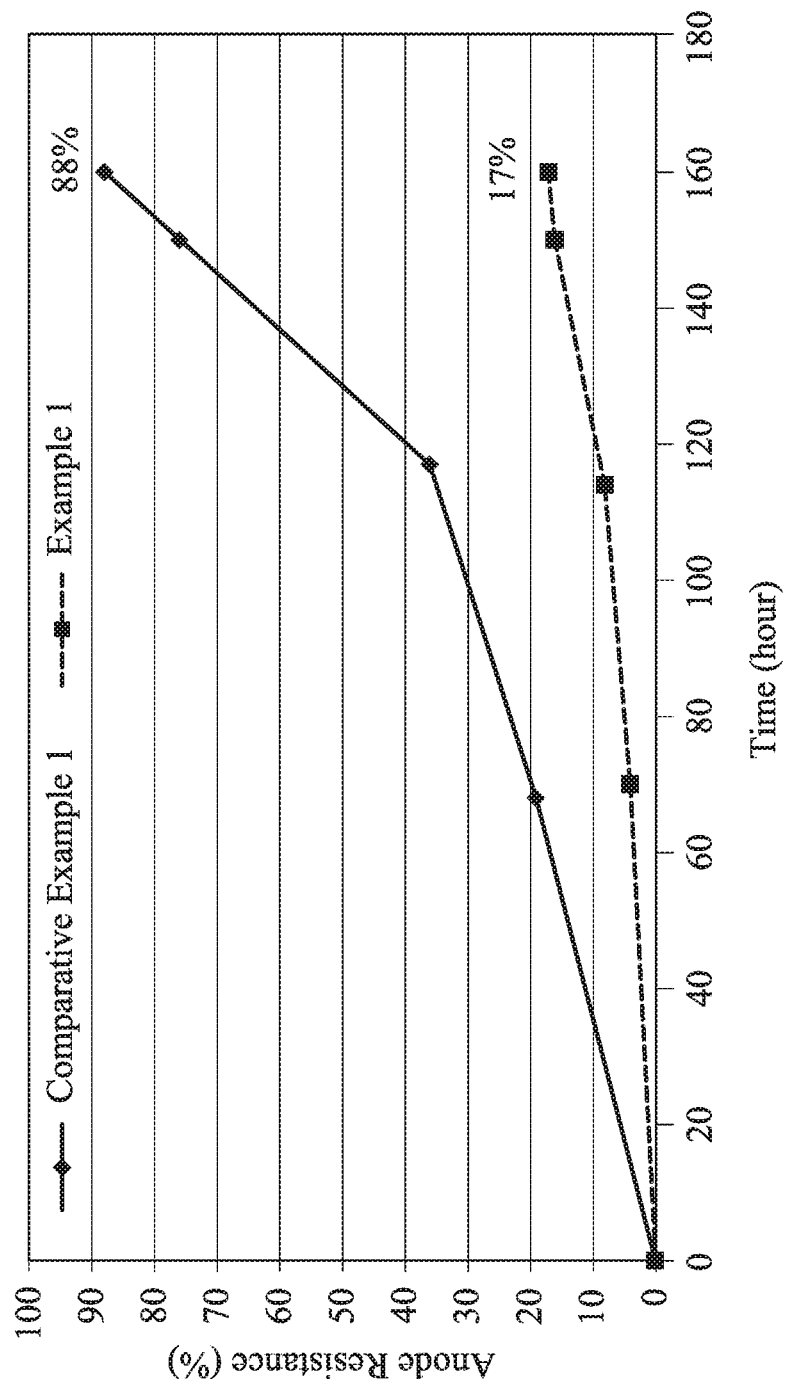
FIG. 3 is a result of an environmental test of a conductive structure according to an embodiment of the present disclosure.

The conductive structures of Experimental Example 1 and Comparative Example 1 were subjected to an environmental test at a temperature of 85° C., a relative humidity of 85%, and a DC voltage of 12V. The results are shown in FIG. 3. Referring to FIG. 3, after 160 hours, the variation in the anode resistance of Comparative Example 1 was 88%, and the variation in the anode resistance of Experimental Example 1 was 17%. It can be known from the environmental test results that the conductive structure having the self-assembled protective layer greatly reduces the conductivity degradation. The self-assembled protective layer can protect the conductive layer covered thereby and effectively suppress the metal corrosion of the conductive layer.

As described above, according to the embodiments of the present disclosure, the self-assembled coating composition and the conductive structure including the self-assembled protective layer are provided. This conductive structure can be applied to any electronic device, such as a display device. Compared with prior art, the self-assembled protective layer of the present disclosure provides a strong anti-corrosion barrier which can protect the conductive layer in the conductive structure and improves the issue of corrosion of the conductive layer.

It is also noted that, when some hydrophobic treatments that may be applied to large-sized bulk metal layers to suppress metal corrosion are applied to nanowire metal layers, the hydrophobic treatments may not be sufficient to protect the nanowire metal layer since the microscopic size will change the material characteristics, resulting in a significant increase of the resistance of the nanowire metal layer, disconnection, or yellowing and decrease of transparency. The experiments of the present disclosure confirm that the self-assembled protective layer of the present disclosure can effectively protect various conductive layers in the form of bulk, micro wire, nanowire, mesh, particle, cluster, or sheet, and greatly reduces the proportion of increase of the resistance over time.

In addition, since the self-assembled protective layer of the present disclosure can be disposed on the conductive layer of the finished product, rather than the transition process that is removed after the hydrophobic treatments, it can provide longer-term protection. In addition, since the self-assembled protective layer of the present disclosure can be used as a part of the finished product stack, the materials, composition, and ratio of the self-assembled protective layer can be selected according to the requirements of electrical properties, optical characteristics, refractive index, material adhesion, and flexibility to overcome issues related to electrical properties, optical characteristics, refractive index, material adhesion, and flexibility of conventional conductive structures and to obtain a more reliable conductive structure.

The present disclosure has been disclosed in the above embodiments, and is not intended to limit the present disclosure, and it is obvious to those skilled in the art that various alternations and modifications may be made without departing from the spirit and scope of the present disclosure. The scope of the present disclosure is defined by the scope of the appended claims.

What is claimed is:
1. A conductive structure having a self-assembled protective layer, comprising:
   a substrate;

a conductive layer disposed over the substrate, wherein the conductive layer comprises nanowires; and a self-assembled protective layer covering the conductive layer, wherein:

the self-assembled protective layer comprises from 75 wt % to 95 wt % of poly(methyl methacrylate) and from 0.1 wt % to 10 wt % of 2,3,4,5,6-pentafluoroaniline, and under a test at a temperature of 85° C., a relative humidity of 85%, and a direct current (DC) voltage of 12V, a variation of a resistance of the conductive structure is less than 10% after 120 hours.

2. The conductive structure of claim 1, wherein the self-assembled protective layer comprises 2 wt % of the 2,3,4,5,6-pentafluoroaniline.

3. The conductive structure of claim 1, wherein a thickness of the self-assembled protective layer on an upper surface of the conductive layer is about 10 nm.

4. The conductive structure of claim 1, wherein the nanowires are silver nanowires.

5. The conductive structure of claim 1, wherein the self-assembled protective layer has a thickness in a range of from about 10 nm to about 0.5 cm.

6. A conductive structure having a self-assembled protective layer, comprising:

a substrate;

a conductive layer disposed over the substrate, wherein the conductive layer comprises nanowires; and a self-assembled protective layer covering the conductive layer, wherein:

the self-assembled protective layer comprises 75, 76, 80, 85, 90, 92, 94, 95 or 98 wt % of poly(methyl methacrylate) and 0.1, 0.2, 1.5, 1, 2, 5, 7, 9 or 10 wt % of 2,3,4,5,6-pentafluoroaniline, and under a test at a temperature of 85° C., a relative humidity of 85%, and a direct current (DC) voltage of 12V, a variation of a resistance of the conductive structure is less than 10% after 120 hours.

7. The conductive structure of claim 6, wherein the self-assembled protective layer comprises 98 wt % of poly(methyl methacrylate) and 2 wt % of the 2,3,4,5,6-pentafluoroaniline.

8. The conductive structure of claim 6, wherein a thickness of the self-assembled protective layer on an upper surface of the conductive layer is about 10 nm.

9. The conductive structure of claim 6, wherein the nanowires are silver nanowires.

10. The conductive structure of claim 6, wherein the self-assembled protective layer has a thickness in a range of from about 10 nm to about 0.5 cm.

* * * * *